(12) United States Patent
Rawe

(10) Patent No.: US 7,290,088 B2
(45) Date of Patent: Oct. 30, 2007

(54) SYSTEM AND METHOD FOR COERCION OF DISK DRIVE SIZE FOR USE IN A RAID VOLUME

(75) Inventor: Lawrence J. Rawe, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 238 days.

(21) Appl. No.: 11/247,879

(22) Filed: Oct. 11, 2005

(65) Prior Publication Data

US 2007/0083706 A1   Apr. 12, 2007

(51) Int. Cl.
*G06F 12/00* (2006.01)
(52) U.S. Cl. .................. 711/114; 711/100; 711/112; 711/170
(58) Field of Classification Search ............... 711/114, 711/100, 170, 112
See application file for complete search history.

(56) References Cited

U.S. PATENT DOCUMENTS

2005/0278484 A1 * 12/2005 Mukker et al. ............. 711/114

* cited by examiner

*Primary Examiner*—Kimberly McLean-Mayo
(74) *Attorney, Agent, or Firm*—Suiter Swantz PC LLO

(57) ABSTRACT

The present invention is a method for coercing disk drive capacity in a RAID configuration. The method includes the step of determining actual disk drive capacities of a first disk drive and a second disk drive in the RAID configuration. If the actual disk drive capacities of the first disk drive and the second disk drive differ, the method further includes multiplying the smaller actual disk drive capacity by a coercion ratio to establish an optimal disk drive capacity. The optimal disk drive capacity sets a minimum capacity threshold for any disk drive utilized within the RAID configuration. If the actual disk drive capacities of the first disk drive and the second disk drive are an equal value, the method further includes multiplying the value by the coercion ratio to establish the optimal disk drive capacity. The coercion ratio is a quotient of a first interpreted value for a number of bytes in a unit of disk drive capacity measurement and a second interpreted value for a number of bytes in the unit of disk drive capacity measurement.

20 Claims, 3 Drawing Sheets

BITS_PER_LBA    512
LBAS_PER_10_9_GB      ( (10^9) / BITS_PER_LBA)
LBAS_PER_2_30_GB      ( (2^30) / BITS_PER_LBA)

CoerceDisk
(
    IN    SizeOfDiskToCoerce
)
{
    INT         CoercedDiskSize;
    FLOAT       CoercionRatio;

CoercionRatio = (LBAS_PER_10_9_GB / LBAS_PER_2_30_GB);

CoercedDiskSize = (SizeOfDiskToCoerce * CoercionRation);

/* Subtract reserved space for configuration data stored on disks */
    CoercedDisksize = CoercedDiskSize - SIZE_RESERVED_DATA_AREA;

Return(CoercedDiskSize);
}

*FIG. 3*

SYSTEM AND METHOD FOR COERCION OF DISK DRIVE SIZE FOR USE IN A RAID VOLUME

FIELD OF THE INVENTION

The present invention relates to the field of electronic data storage and particularly to a system and method for coercion of disk drive size for use in a RAID (Redundant Array of Inexpensive/Independent Disks) volume.

BACKGROUND OF THE INVENTION

RAID volumes employ two or more disk drives, which act in combination as one large disk drive, for improved fault tolerance and performance. Businesses often implement RAID volumes because some such volumes can remain functional if one or more of the disk drives fails or becomes damaged. This can be invaluable to businesses by preventing downtime and/or loss of valuable data when a disk drive becomes damaged. When setting up a RAID volume, it is desirable to calculate space used on each disk drive (i.e., capacity) so that maximum compatibility with disk drives from various vendors and having various sizes is maintained. This ensures that a user is not restricted to a specific disk drive model, size or vendor if the user needs to replace a disk drive used in his or her existing RAID configuration. This method of disk drive sizing is often referred to as disk drive coercion.

The process of determining the optimal disk drive usage size has become increasingly difficult given the increasing size of disk drives and resulting larger margin for size variance in disk drives from multiple vendors labeled as having the same capacity. One of the most difficult situations involves the interpretation of what the size of a "Gigabyte" (GB) is. Some vendors use this measurement to refer to $2^{30}$ bits, while others use it to refer to $10^9$ bits. Consequently, 2 disk drives from different vendors may both be listed as having the same capacity in Gigabytes, but vary drastically in actual capacity. Current examples of disk coercion, such as predefined table lookup methods or rounding down methods (to the nearest 1 GB, nearest 512 MB boundary, etc.) do not adequately address the above-referenced problems in that they: 1) fail to provide a large range of usable disk drive sizes; and 2.) fail to adequately account for disk drives sized using different interpretations of what a Gigabyte is.

Therefore, it would be advantageous to devise a system and method to coerce the size used on a disk drive in a RAID volume such that disks listed with the same size in Gigabytes, that have different actual sizes due to different interpretations of what a Gigabyte is, would be interchangeable for use in a RAID configuration.

SUMMARY OF THE INVENTION

Accordingly, an embodiment of the present invention is directed to a RAID (Redundant Array of Inexpensive Disks) system which includes a first disk drive and a second disk drive. Also included is a controller communicatively coupled with the first disk drive and the second disk drive. The controller is configured to determine actual disk drive capacities of the first disk drive and the second disk drive. If the actual disk drive capacities of the first disk drive and the second disk drive differ, the controller is further configured to multiply the smaller actual disk drive capacity by a coercion ratio to establish an optimal disk drive capacity. The optimal disk drive capacity sets a minimum capacity threshold for any disk drive utilized within the RAID system. Alternatively, if the actual disk drive capacities of the first disk drive and the second disk drive are an equal value, the controller is configured to multiply the value by the coercion ratio to establish the optimal disk drive capacity. The coercion ratio is a quotient of a first interpreted value for a number of bytes in a unit of disk drive capacity measurement and a second interpreted value for a number of bytes in the unit of disk drive capacity measurement.

A further embodiment of the present invention is directed to a method for coercing disk drive capacity in a RAID configuration. The method includes the step of determining actual disk drive capacities of a first disk drive and a second disk drive in the RAID configuration. If the actual disk drive capacities of the first disk drive and the second disk drive differ, the method further includes the step of multiplying the smaller actual disk drive capacity by a coercion ratio to establish an optimal disk drive capacity. The optimal disk drive capacity sets a minimum capacity threshold for any disk drive utilized within the RAID configuration. Alternatively, if the actual disk drive capacities of the first disk drive and the second disk drive are an equal value, the method includes the step of multiplying the value by the coercion ratio to establish the optimal disk drive capacity. The coercion ratio is a quotient of a first interpreted value for a number of bytes in a unit of disk drive capacity measurement and a second interpreted value for a number of bytes in the unit of disk drive capacity measurement.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is an illustration of software coding which may be implemented with the system and method of the present invention; a system for fabric storage utilizing multicast with distributed intelligence in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Figure 1:
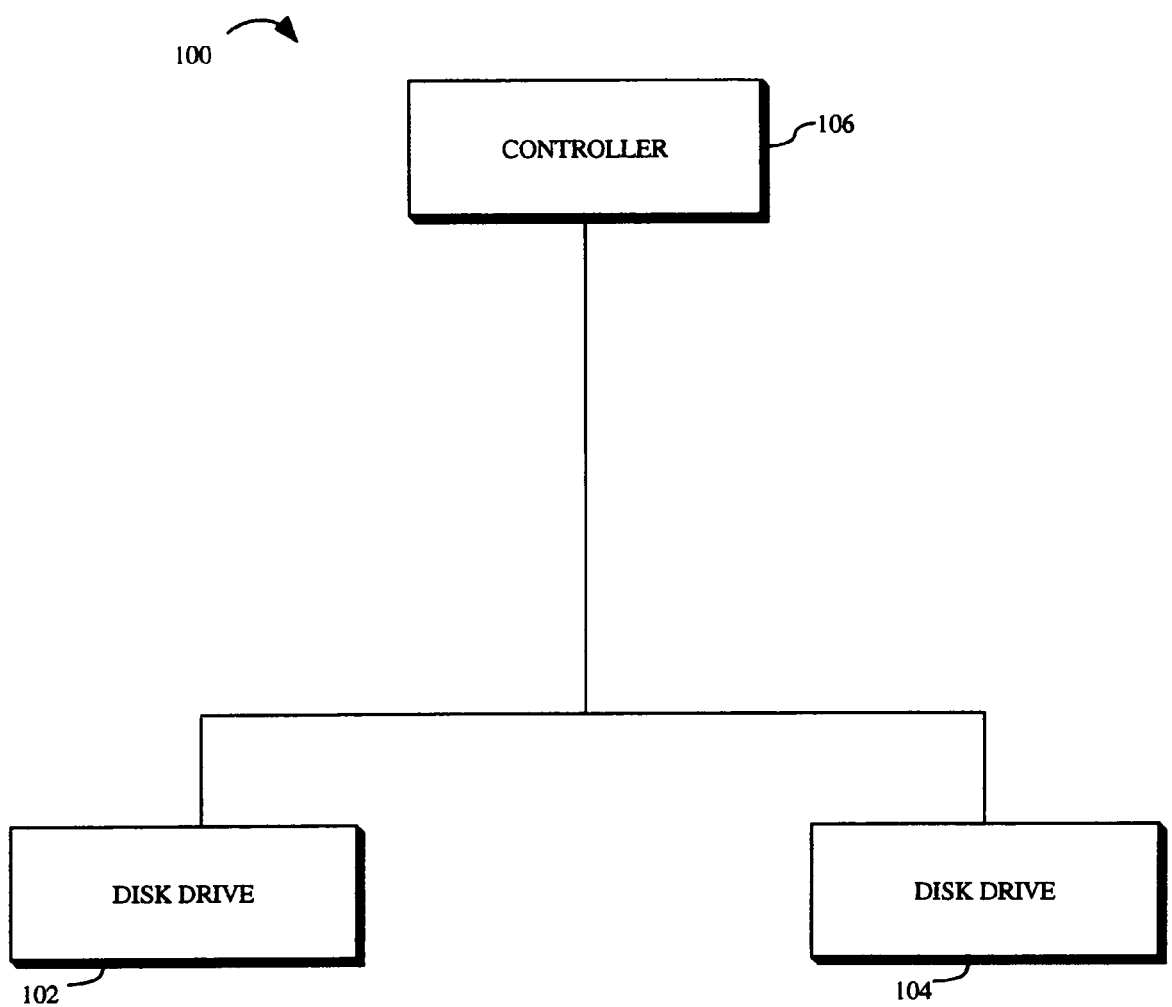
FIG. 1 is an illustration of a RAID (Redundant Array of Inexpensive Disks) system in accordance with an exemplary embodiment of the present invention.

FIG. 1 illustrates a RAID (Redundant Array of Inexpensive Disks) system in accordance with an exemplary embodiment of the present invention. The system 100 includes a first disk drive 102, a second disk drive 104 and a controller 106 communicatively coupled with the first and second disk drives. The controller 104 controls how data is stored on each of the disk drives (102, 104). In the exemplary embodiment, the first disk drive 102 and the second disk drive 104 each have a listed (i.e., logical) disk drive capacity of one Gigabyte (1 GB). Preferably, each disk drive in the RAID system has an equal actual disk drive capacity. The RAID controller 106 determines how data is stored on each disk drive (102, 104) within the RAID system. Typically, RAID controllers "coerce" each disk drive within the RAID system to store only as much data as can be stored by the disk drive with the lowest actual disk drive capacity (i.e., the optimal disk drive capacity). Further, for a replacement disk drive to be compatible with the disk drives of a RAID system, the replacement disk drive must be able to store an amount of data equal to or greater than the optimal disk drive capacity.

At first glance, it may seem relatively simple for a user to locate and install a compatible replacement disk drive if one of the disk drives in the RAID system illustrated in FIG. 1 were to fail. For example, since both disk drives (102, 104) in the system 100 have listed disk drive capacities of 1 Gigabyte, it would seem that he or she would only have to find a replacement disk drive with a listed disk drive capacity of at least 1 Gigabyte and substitute it for the failed disk drive. If the user is obtaining the replacement disk drive from the same vendor from which the failed disk drive was obtained, the above course of action will probably work fine. However, different vendors measure disk drive capacity differently. A common example would be the manner in which vendors currently measure Gigabytes. For instance, a first vendor may interpret a Gigabyte to be equal to $10^9$ (1,000,000,000) bytes, as defined by the International Electrotechnical Commission (IEC), while a second vendor may interpret a Gigabyte to be equal to $2^{30}$ (1,073,741,824) bytes, consistent with another commonly used definition of the term in the art. As a result, it is possible that the first and second vendors may each sell disk drives, both labeled/listed as 1 Gigabyte (GB), when, in reality, the disk drives' actual disk drive capacities vary by a large amount, due to the above-noted discrepancy in interpreted values for a Gigabyte. This is problematic in that the optimal disk drive capacity is typically determined utilizing actual disk drive capacities. Therefore, if a user has a RAID system in which the smallest actual capacity disk drive is listed as having a 1 Gigabyte capacity, and that disk drive was produced by a vendor who interpreted a Gigabyte to be equal to $2^{30}$ (1,073,741,824) bytes, then if a user tries to replace that disk drive with a second disk drive, also listed as having 1 Gigabyte capacity, but produced by a vendor who defined a Gigabyte as being equal to $10^9$ (1,000,000) bytes, the replacement disk drive would have an actual disk drive capacity that was inadequate for implementation within the RAID system. Consequently, the user may be limited to obtaining disk drives from the same vendor in order to be assured that the disk drives' actual disk drive capacities were determined in the same manner.

Figure 2:
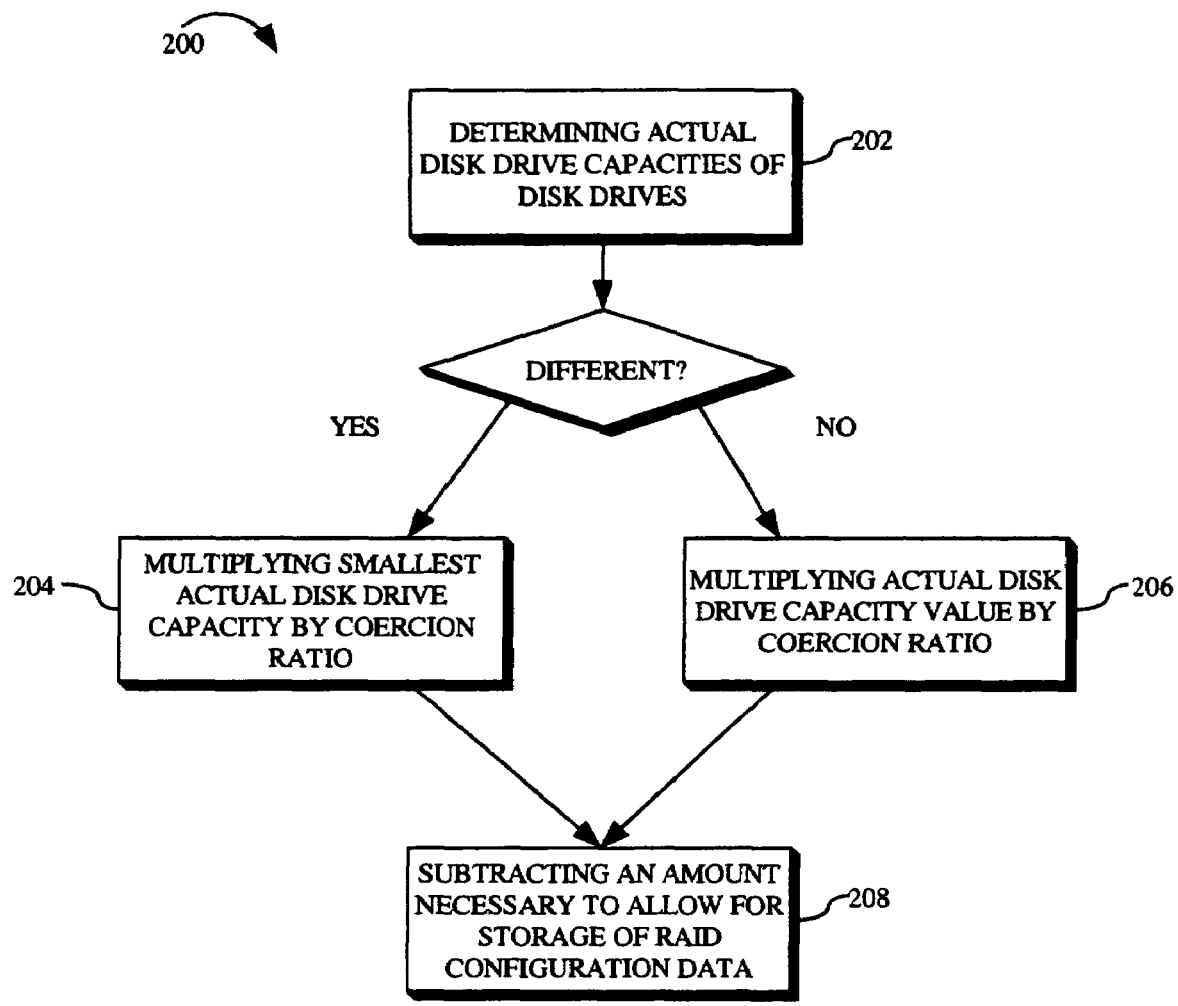
FIG. 2 is an illustration of a method for coercing disk drive capacity in a RAID configuration in accordance with an exemplary embodiment of the present invention.

FIG. 2 illustrates a method 200 for how the RAID system 100 of the present invention addresses the above-referenced problems. In a present embodiment, the RAID controller determines actual disk drive capacities of a first disk drive and a second disk drive in the RAID system 202. For example, the first and second disk drives may each have a listed capacity of 1 Gigabyte (1 GB), but perhaps the controller determines that the actual disk drive capacity of the first disk drive is $10^9$ bytes, while the actual disk drive capacity of the second controller is $2^{30}$ bytes. If the actual disk drive capacities of the first disk drive and the second disk drive differ, (as in the above example), the method further includes the step of multiplying the smaller actual disk drive capacity ($10^9$ bytes) by a coercion ratio to establish an optimal disk drive capacity for the RAID system 204. The optimal disk drive capacity sets a minimum capacity threshold for any disk drive utilized within the RAID system. Basically, any disk drive that is to be compatible within the RAID system should have an actual disk drive capacity equal to or greater than the optimal disk drive capacity for the RAID system. Alternatively, if the actual disk drive capacities of the first disk drive and the second disk drive are an equal value, (if they are both $2^{30}$ or both $10^9$) the method includes the step of multiplying the value by the coercion ratio to establish the optimal disk drive capacity 206. In a current embodiment, the coercion ratio is a quotient of a first interpreted value for a number of bytes in a unit of disk drive capacity measurement and a second interpreted value for a number of bytes in the unit of disk drive capacity measurement. For example, a unit of disk drive capacity measurement may be Gigabytes (GB). Further, the first interpreted value for a number of bytes in a unit of disk drive capacity measurement (ex.—a Gigabyte) equals $10^9$ (1,000,000,000) bytes, while a second interpreted value for number of bytes in the unit of disk drive capacity measurement (Gigabyte) equals $2^{30}$ (1,073,741,824), as discussed above.

In this way, the controller establishes an optimal disk drive capacity which only requires a user to make sure that the replacement disk drive has a labeled (listed) disk drive capacity equal to or greater than the listed disk drive capacity of the disk drive within the RAID system. Further, the user does not have to worry about how the vendors determined the listed disk drive capacities (using $2^{30}$ bytes or $10^9$ bytes as the definition of a Gigabyte) because the coercion ratio accounts for the discrepancy of the interpreted values of numbers of bytes per the unit of disk drive capacity in question. Therefore, a user can be assured that disk drives having an equal listed disk drive capacity in Gigabytes are interchangeable for use within the RAID system 100, regardless of whether the listed disk drive capacity was determined using $2^{30}$ bytes or $10^9$ bytes as the interpreted value of a Gigabyte. For example, a unit of disk drive capacity measurement may be Gigabytes (GB). Further, the first interpreted value for number of bytes in a unit of disk drive capacity measurement (ex.—a Gigabyte) equals $10^9$ (1,000,000,000) bytes, while a second interpreted value for number of bytes in the unit of disk drive capacity measurement (Gigabyte) equals $2^{30}$ (1,073,741,824), as discussed above.

Further, the system 100 and method 200 of the present invention may provide for a greater range of usable disk drive sizes from which the user may select. In an exemplary embodiment, the RAID system 100 of the present invention may include a plurality of disk drives (102, 104), each having a listed disk drive capacity of 100 Gigabytes, each sized via the same interpreted value, $2^{30}$ bytes/Gigabyte, thus, each also having a same actual disk drive capacity value. The controller 106 then multiplies the actual disk drive capacity value by the coercion ratio to allow for compatibility with a replacement disk drive, also having a listed disk drive capacity of 100 Gigabytes, but sized via the interpreted value, $10^9$ bytes/Gigabyte. This effectively reduces the actual disk drive capacity used by the 100 Gigabyte (sized via $2^{30}$ bytes/Gigabyte) disk drive to approximately 93 Gigabytes. Consequently, if the replacement disk chosen was also sized via $2^{30}$ bytes/Gigabyte, (ex.—from the same vendor), the replacement disk could have a listed disk drive capacity, for example, of approximately 94-100 GB, and be assured of at least meeting the optimal disk drive capacity established by the controller. In this manner, the above system and method may provide a user who is choosing a replacement disk, sized in the same manner as the disk drive in the RAID system which it is replacing, a greater range of replacement disk drives from which to choose.

In further embodiments, the coercion ratio may be established in order to address discrepancies involving multiple interpreted values of other disk drive capacity units, such as Terabytes (TB), Megabytes (MB) or the like. For example, if the disk drive capacities for disk drives in a RAID system are measured in Terabytes (TB), the coercion ratio may be the quotient of $10^{12}/2^{40}$, to account for the varying interpreted values for a Terabyte (i.e.—$10^{12}$ bytes/Terabyte or $2^{40}$ bytes/Terabyte). If the disk drive capacities for disk drives in a RAID system are measured in Megabytes (MB), the coercion ratio may be the quotient of $10^{6}/2^{20}$, to account for the varying interpreted values for a Megabyte (i.e.—$10^{6}$ bytes/Megabyte or $2^{20}$ bytes/Megabyte) and so forth.

In additional embodiments, the method includes the step of reducing the optimal disk drive capacity by an amount necessary to allow for storage of data pertaining to the RAID system/configuration 208, such as Disk Data Format (DDF) data. In alternative embodiments, at least one or more of the above described steps may be controllable by an end user.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art. An example of such software coding is illustrated in FIG. 3.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for coercing disk drive capacity in a RAID (Redundant Array of Inexpensive Disks) configuration, comprising:

determining actual disk drive capacities of a first disk drive and a second disk drive in the RAID configuration; and if the actual disk drive capacities of the first disk drive and the second disk drive differ, multiplying the smaller actual disk drive capacity by a coercion ratio to establish an optimal disk drive capacity, the optimal disk drive capacity setting a minimum capacity threshold for any disk drive utilized within the RAID configuration;

if the actual disk drive capacities of the first disk drive and the second disk drive are an equal value, multiplying the value by the coercion ratio to establish the optimal disk drive capacity;

wherein the coercion ratio is a quotient of a first interpreted value for a number of bytes in a unit of disk drive capacity measurement and a second interpreted value for a number of bytes in the unit of disk drive capacity measurement.

2. A method for coercing disk drive capacity in a RAID configuration as claimed in claim 1, wherein the unit of disk drive capacity measurement is Gigabytes.

3. A method for coercing disk drive capacity in a RAID configuration as claimed in claim 2, wherein the coercion ratio is $10^{9}/2^{30}$ (ten to the ninth power divided by two to the thirtieth power).

4. A method for coercing disk drive capacity in a RAID configuration as claimed in claim 1, wherein the unit of disk drive capacity measurement is one of Terabytes or Megabytes.

5. A method for coercing disk drive capacity in a RAID configuration as claimed in claim 1, further comprising the step of:

reducing the optimal disk drive capacity by an amount necessary to allow for storage of data pertaining to the RAID configuration.

6. A method for coercing disk drive capacity in a RAID configuration as claimed in claim 5, wherein the data pertaining to the RAID configuration is Disk Data Format (DDF) data.

7. A method for coercing disk drive capacity in a RAID configuration as claimed in claim 5, wherein at least one of the method steps is controllable by an end user.

8. A computer-readable medium having computer-executable instructions for performing a method for coercing disk drive capacity in a RAID configuration, said method comprising steps of:

determining actual disk drive capacities of a first disk drive and a second disk drive in the RAID configuration; and if the actual disk drive capacities of the first disk drive and the second disk drive differ, multiplying the smaller actual disk drive capacity by a coercion ratio to establish an optimal disk drive capacity, the optimal disk drive capacity setting a minimum capacity threshold for any disk drive utilized within the RAID configuration;

if the actual disk drive capacities of the first disk drive and the second disk drive are an equal value, multiplying the value by the coercion ratio to establish the optimal disk drive capacity;

wherein the coercion ratio is a quotient of a first interpreted value for a number of bytes in a unit of disk drive capacity measurement and a second interpreted value for a number of bytes in the unit of disk drive capacity measurement.

9. A computer-readable medium as claimed in claim 8, wherein the unit of disk drive capacity measurement is Gigabytes.

10. A computer-readable medium as claimed in claim 9, wherein the coercion ratio is 10^9/2^30 (ten to the ninth power divided by two to the thirtieth power).

11. A computer-readable medium as claimed in claim 8, wherein the unit of disk drive capacity measurement is one of Terabytes or Megabytes.

12. A computer-readable medium as claimed in claim 8, said method further comprising the step of:
reducing the optimal disk drive capacity by an amount necessary to allow for storage of data pertaining to the RAID configuration.

13. A computer-readable medium as claimed in claim 12, wherein the data pertaining to the RAID configuration is Disk Data Format (DDF) data.

14. A computer-readable medium as claimed in claim 12, wherein at least one of the method steps is controllable by an end user.

15. A RAID (Redundant Array of Inexpensive Disks) system, comprising:
a first disk drive and a second disk drive; and
a controller communicatively coupled with the first disk drive and the second disk drive, the controller configured to determine actual disk drive capacities of the first disk drive and the second disk drive, if the actual disk drive capacities of the first disk drive and the second disk drive differ, the controller being configured to multiply the smaller actual disk drive capacity by a coercion ratio to establish an optimal disk drive capacity, the optimal disk drive capacity setting a minimum capacity threshold for any disk drive utilized within the RAID system, if the actual disk drive capacities of the first disk drive and the second disk drive are an equal value, the controller being configured to multiply the value by the coercion ratio to establish the optimal disk drive capacity; the coercion ratio being a quotient of a first interpreted value for a number of bytes in a unit of disk drive capacity measurement and a second interpreted value for a number of bytes in the unit of disk drive capacity measurement.

16. A RAID system as claimed in claim 15, wherein the unit of disk drive capacity measurement is Gigabytes.

17. A RAID system as claimed in claim 16, wherein the coercion ratio is 10^9/2^30 (ten to the ninth power divided by two to the thirtieth power).

18. A RAID system as claimed in claim 15, wherein the unit of disk drive capacity measurement is one of Terabytes or Megabytes.

19. A RAID system as claimed in claim 15, wherein the controller may be further configured to reduce the optimal disk drive capacity by an amount necessary to allow for storage of data pertaining to the RAID system.

20. A RAID system as claimed in claim 19, wherein the data pertaining to the RAID configuration is Disk Data Format (DDF) data.

* * * * *